(12) United States Patent
Benjakachorndech et al.

(10) Patent No.: US 11,502,358 B1
(45) Date of Patent: Nov. 15, 2022

(54) POWER AND CONTROLLER BOX FOR LIGHTING APPARATUS

(71) Applicant: Seasonal Specialties, LLC, Eden Prairie, MN (US)

(72) Inventors: Narong Benjakachorndech, Dongguan (CN); Christine Werner, St. Louis Park, MN (US); Steven Altamura, Scarsdale, NY (US)

(73) Assignee: Seasonal Specialties, LLC, Eden Prairie, MN (US)

( * ) Notice: Subject to any disclaimer, the term of this patent is extended or adjusted under 35 U.S.C. 154(b) by 558 days.

(21) Appl. No.: 16/562,250

(22) Filed: Sep. 5, 2019

Related U.S. Application Data

(60) Provisional application No. 62/727,854, filed on Sep. 6, 2018.

(51) Int. Cl.
*H01M 50/147* (2021.01)
*F21L 4/04* (2006.01)
*H01M 50/20* (2021.01)

(52) U.S. Cl.
CPC ............. *H01M 50/147* (2021.01); *F21L 4/04* (2013.01); *H01M 50/20* (2021.01); *H01M 2220/10* (2013.01)

(58) Field of Classification Search
CPC .............. H01M 50/147; H01M 50/20; H01M 2220/10; F21L 4/04
USPC ........................................................... 320/112
See application file for complete search history.

(56) References Cited

U.S. PATENT DOCUMENTS

| | | | | |
|---|---|---|---|---|
| D468,688 | S | * | 1/2003 | Helman .......................... D3/282 |
| D495,994 | S | * | 9/2004 | Arakelian ...................... D13/103 |
| D516,505 | S | * | 3/2006 | Niitsuma ....................... D13/106 |
| D517,479 | S | * | 3/2006 | Schemm ........................ D13/103 |
| D517,987 | S | * | 3/2006 | Castagnola ................... D13/119 |
| D527,344 | S | * | 8/2006 | Rajpara ......................... D13/119 |
| D759,590 | S | | 6/2016 | Wang |
| 10,205,073 | B2 | * | 2/2019 | Altamura .............. F21V 19/001 |
| D912,616 | S | * | 3/2021 | He ................................ D13/103 |
| D929,333 | S | * | 8/2021 | Benjakachorndech ...... D13/119 |
| 2016/0341408 | A1 | | 11/2016 | Altamura |

* cited by examiner

*Primary Examiner* — Paul Dinh
(74) *Attorney, Agent, or Firm* — Hamre, Schumann, Mueller & Larson, P.C.

(57) ABSTRACT

A control and battery box for a decorative light apparatus having a housing, a top cover and a battery compartment. Hinges with expanding pins are provided on one edge of the control and battery box and latches on the other. Each expanding pin includes a pair of prongs with a gap therebetween. The pair of prongs are compressed to enter to an aperture in a part of another hinge then be retained therein between shoulders.

10 Claims, 11 Drawing Sheets

POWER AND CONTROLLER BOX FOR LIGHTING APPARATUS

CROSS REFERENCE AND INCORPORATION BY REFERENCE

Priority is claimed from the following applications which is also hereby incorporated by reference in their entirely: U.S. patent application Ser. No. 62/727,854 filed 6 Sep. 2018 entitled Power And Controller Box For Lighting Apparatus and U.S. patent application Ser. No. 29/704,220 filed 3 Sep. 2019 entitled Battery Box.

BACKGROUND OF THE DISCLOSURE

Field of the Disclosure

The present disclosure is directed to a power and controller box for a decorative lighting device, particularly used for decoration and entertainment.

Description of the Related Art

Decorative lighting has as its primary function to decorate and/or entertain. Workspace illumination is a secondary function. Holiday lighting is a subset of decorative lighting and it is characterized by products which can be mass produced at very low cost. Light strings are a good example. These are very inexpensive articles and are often used for only one season. Thus a successful product must provide decorative illumination but do so at the lowest cost possible.

An example of such lighting is found in US Patent Publication No. 2016/0341408 to Altamura and of common ownership with this application. An example of an alternate battery box is shown in U.S. Design No. D759590 to Wang.

BRIEF SUMMARY

The disclosure encompasses many embodiments. One such embodiment is detailed below in summary fashion. Please understand that this summary does not encompass the entire disclosure but is provided to assist the reader in reviewing the entire disclosure and claims which also constitute part of the disclosure.

There is disclosed a decorative lighting apparatus which has any or all of the following elements:
a. a housing having a compartment for batteries;
b. the housing having a battery compartment and a hinged cover;
c. the cover having an exterior face including at least one actuation switch on the face thereof;
d. said hinges including a first part having an orthogonal extension extending from the box, the extension having an aperture and second part extending from an adjacent place on the box, having an orthogonal extension and a pin extending orthogonally from the second part extension;
e. the extending pin being sized to be received in said aperture when in a compressed state, and to have a portion which expands outside of said aperture when in an uncompressed state.

There is also disclosed a control and battery box for a decorative lighting apparatus having any or all of the following elements:
a. a housing having a compartment for batteries;
b. the housing having first and second parts of a battery compartment and a hinged cover;
c. the cover having an exterior face including at least one actuation switch on the face thereof;
d. hinges including a first part an orthogonal extension extending from the first part of the box, the extension having an aperture; and
e. a second part extending from the second part of the box and being an orthogonal extension with a pin extending orthogonally from the second part extension; and
f. the pin including a pair of space apart prongs, said prongs together being sized to be received in said aperture when in a compressed state, and then which expands outside of said aperture when in an uncompressed state.

Also disclosed are prongs which are resilient and deflectable.

Also disclosed are prongs which have a distal end which includes a barb to prevent withdrawal.

Also disclosed are prongs which have central recess bounded by raised shoulders.

Also disclosed are hinge parts which include an aperture and wherein said prongs have an outer diameter when compressed which is less than said aperture and when uncompressed, is larger than said aperture, so that said prong is retained within said aperture when uncompressed.

Also disclosed is a latch, said latch having a hinged flap and a lip, said flap including an aperture large enough to allow the lip therethrough.

Also disclosed is a lip which has an arcuate portion.

Also disclosed is a lip which is deflectable when engaging said flap.

Also disclosed is a control box for a decorative lighting apparatus having any or all of the following elements:
a. the housing having first and second parts of a compartment and a hinged cover;
b. hinges including a first part an orthogonal extension extending from the first part of the box, the extension having an aperture; and
c. a second part extending from the second part of the box and being an orthogonal extension with a pin extending orthogonally from the second part extension;
d. the pin including a pair of space apart prongs, said prongs together being sized to be received in said aperture when in a compressed state, and then which expands outside of said aperture when in an uncompressed state;
e. a pair of latches on the box for securing said first and second parts together.

Also disclosed is a method of making a control box for a decorative lighting apparatus using any or all of the following steps:
a. forming a housing having first and second parts of a compartment and a hinged cover;
b. forming hinges on the box, including a first hinge part an orthogonal extension extending from the first part of the box, the extension having an aperture and a second hinge part extending from the second part of the box and being an orthogonal extension with a pin extending orthogonally from the second part extension;
c. forming the extending pin including a pair of space apart prongs, said prongs together being sized to be received in said aperture when in a compressed state, and then which expands outside of said aperture when in an uncompressed state.

Many other features and combinations are disclosed and claimed.

DETAILED DESCRIPTION

Figure 1:
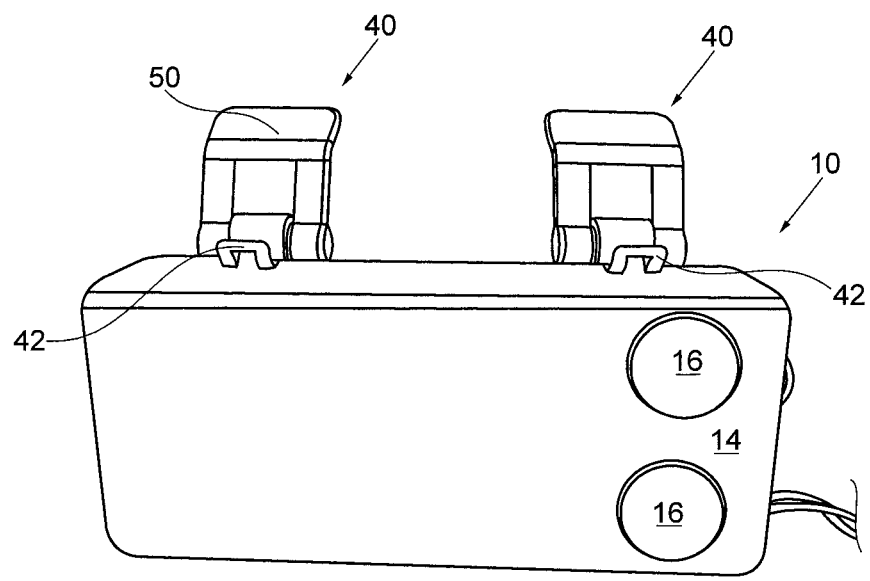
FIG. 1 is a perspective view of a control box.
Figure 2:
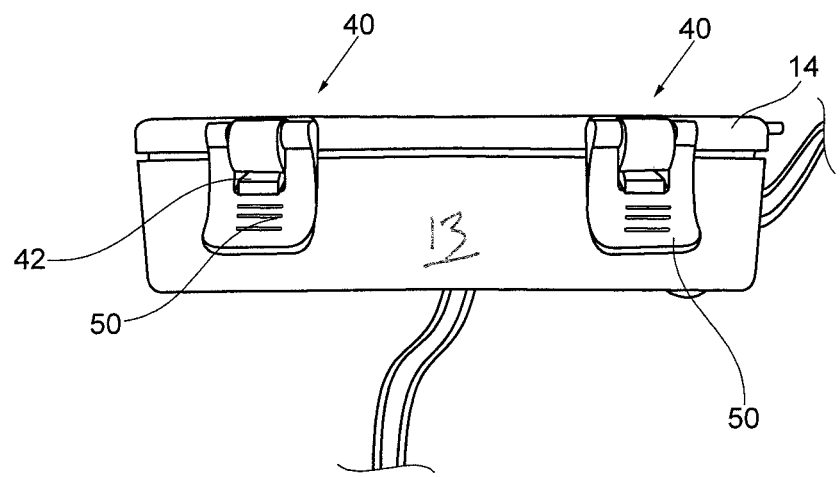
FIG. 2 is side view of the control box.
Figure 3:
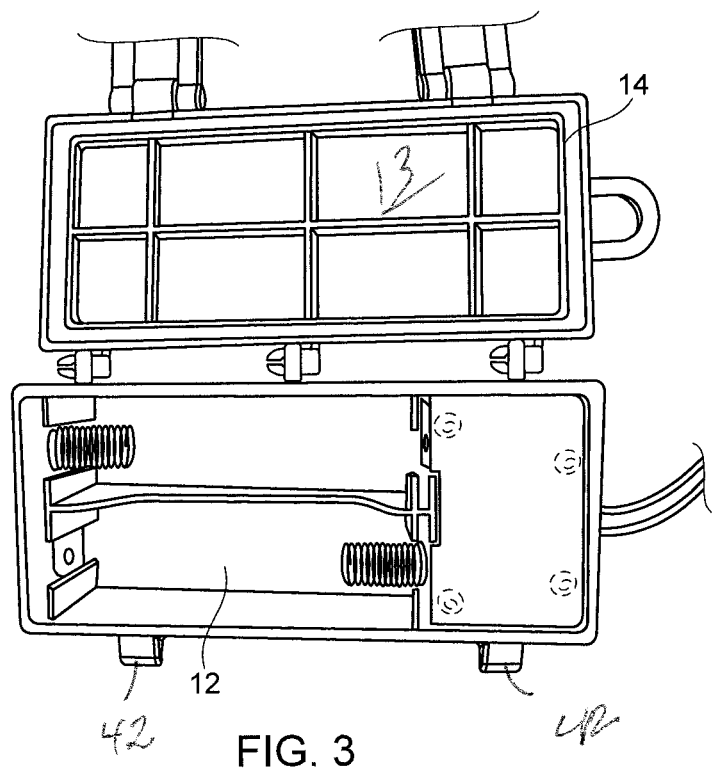
FIG. 3 is perspective view of the control box with the top cover open.
Figure 4:
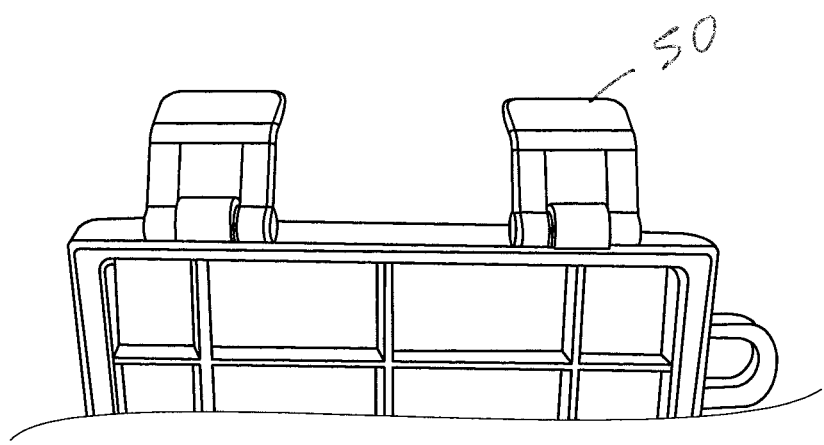
FIG. 4 is a partial perspective view of the top close up of clasps on the top cover.
Figure 5:
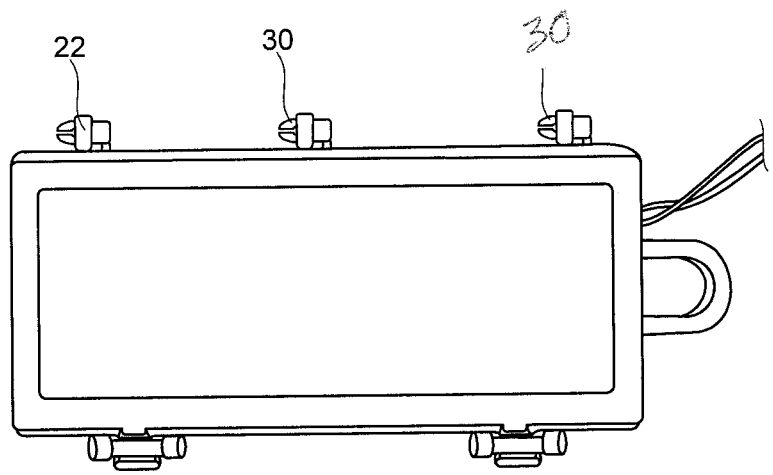
FIG. 5 is a top plan view of the top cover of the control box.

A battery and control box is shown in FIGS. 1-18.
There is a housing 10 having a compartment for batteries 12 and a hinged cover 14.
The cover has an exterior face including actuation switches 16 on the face thereof. The switches are preferably waterproof by use of a flexible film shield over the opening behind which is a mechanical switch which is depressed by flexing the film.
The hinges including a first part has an orthogonal extension 22 extending from the box, the extension having an aperture 24 (occluded by the pin 30) and second part 26 extending from an adjacent place on the box, having an orthogonal extension and a pin 30 extending orthogonally from the second part extension. First and second parts can be the upper and lower portions of the box, such as cover 14 and bottom section 13.
The extending pin 30 being sized to be received in said aperture 24 when in a compressed state, and to have a portion 36 which expands outside of said aperture when in an uncompressed state. Portion 36 has a slotted part which allows the hinge pin 30 to be compressed and at the distal end thereof, the hinge pin has an expanded cross section. The slot and expanded cross section can be compressed to fit through the aperture and then expand to prevent the hinge pin from being easily withdrawn or fall out.
On the other edge of the cover 14 and also on compartment 13 are latches. The latches have a fixed portion with a lip 42 which extent radially from the box and have a curved portion at their distal end. The curved portion is angled toward the bottom of the box when closed, so that it provides a ledge for the remainder of the latch. On the top portion 14 is a hinged flap 50 with an aperture 51 sized to be slightly smaller than the fixed portion with lip 42. The flap is rotated over the lip 42 via the aperture and the lip will deflect slightly to allow the latch to engage. The latches 42/50 can be reversed so that they are on different halves of the box.

Figure 6:
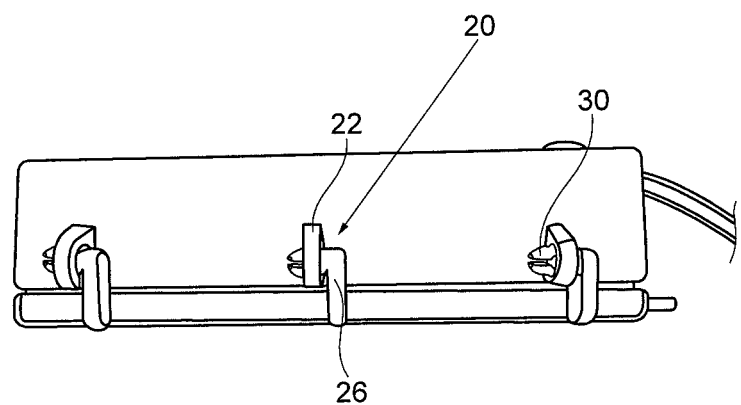
FIG. 6 is a side plan view of the box and hinges.
Figure 7:
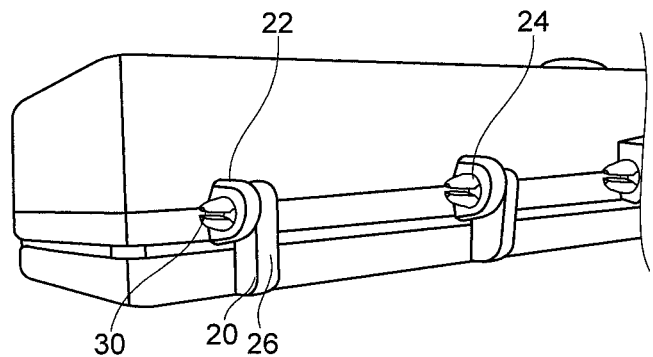
FIG. 7 is a perspective view of a portion of FIG. 6.
Figure 8:
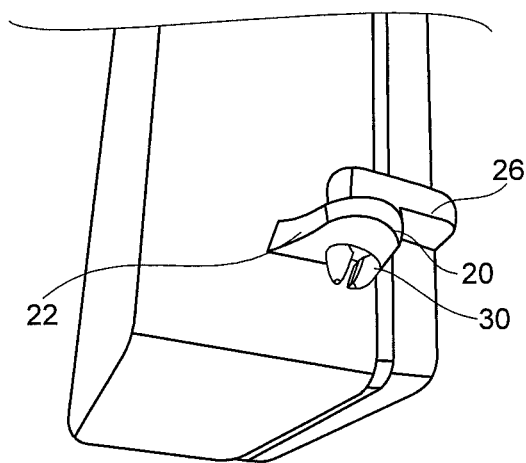
FIG. 8 is a close up perspective view of a portion of FIG. 7.
Figure 9:
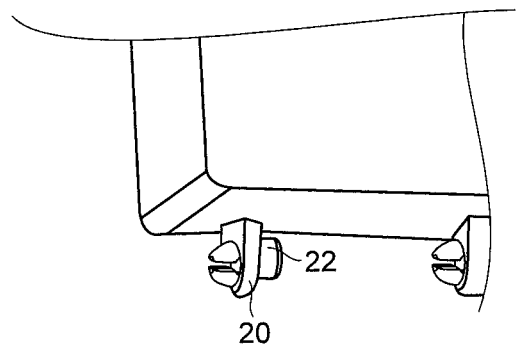
FIG. 9 is a close up perspective view of a portion of FIG. 7.
Figure 10:
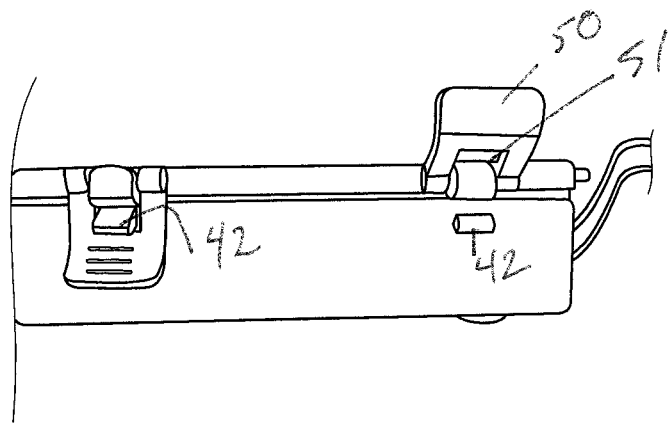
FIG. 10 is a close up perspective view of the control box hinges.
Figure 11:
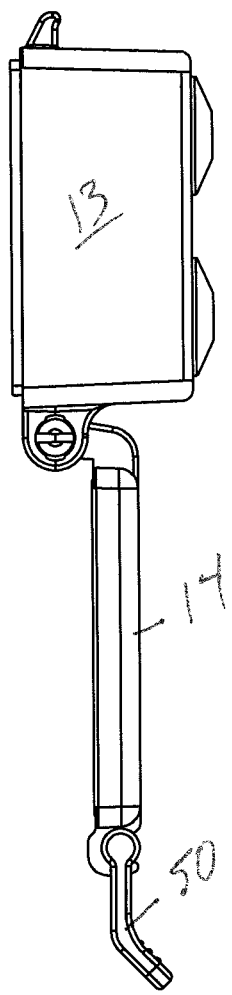
FIG. 11 is a side plan view of the box with top cover open.
Figure 12:
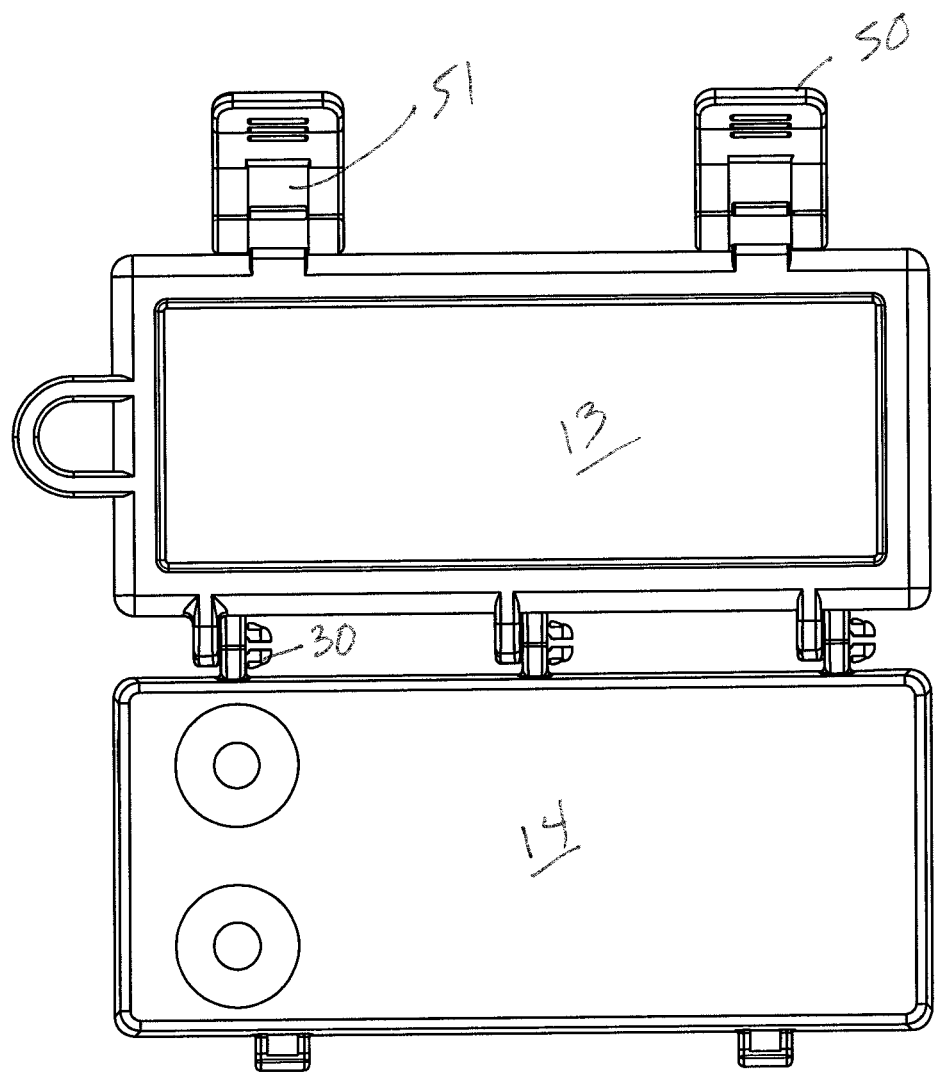
FIG. 12 is a bottom plan view of the box with top cover open.
Figure 13:
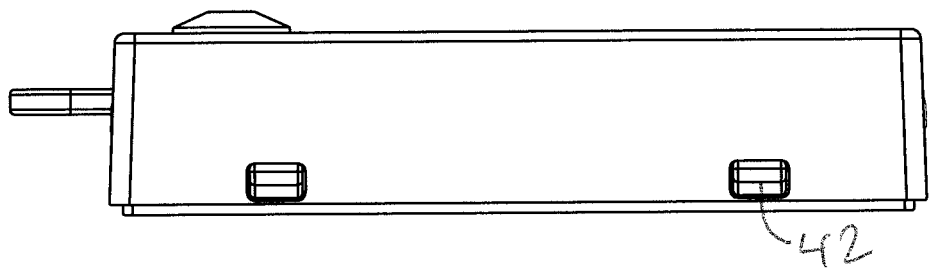
FIG. 13 is a side plan view of the box with cover not visible on the latch side.
Figure 14:
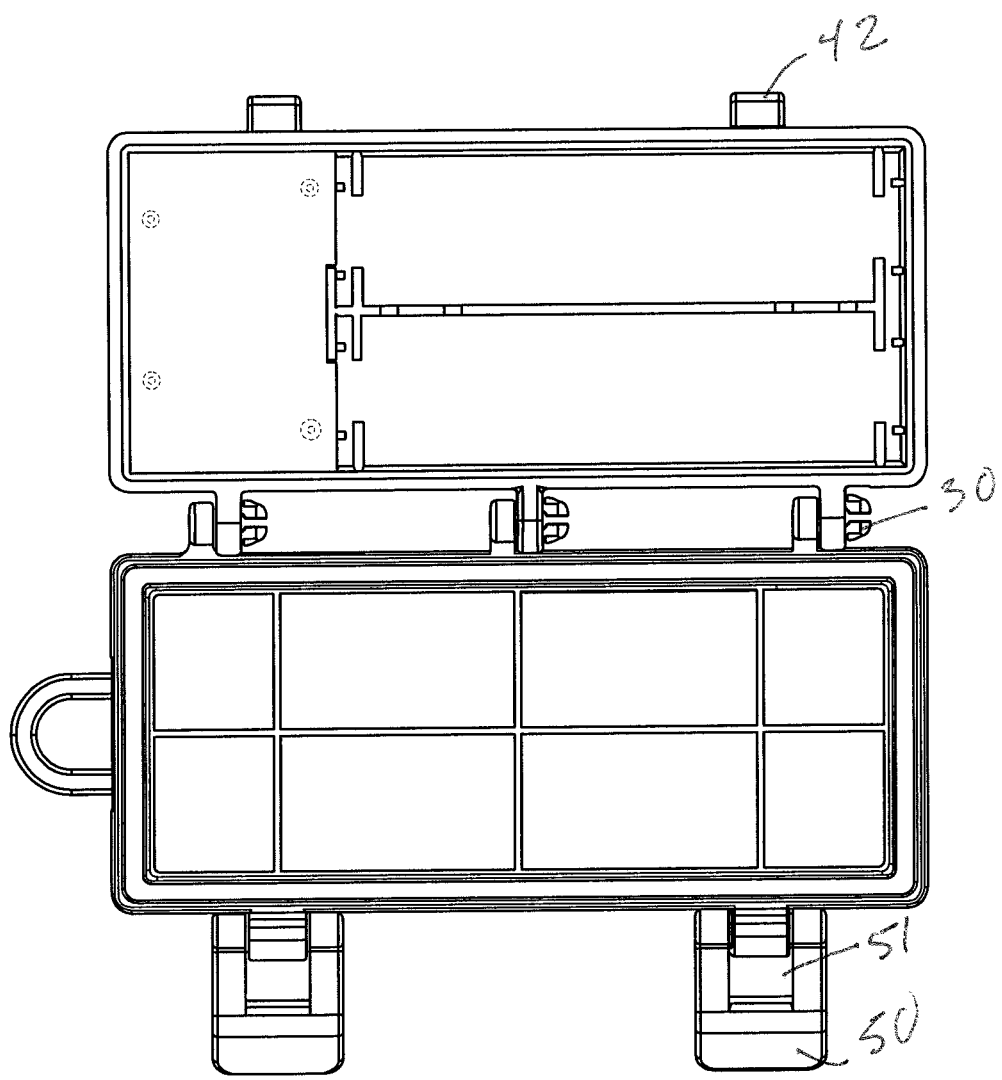
FIG. 14 is a top plan view of the box in FIG. 12.
Figure 15:
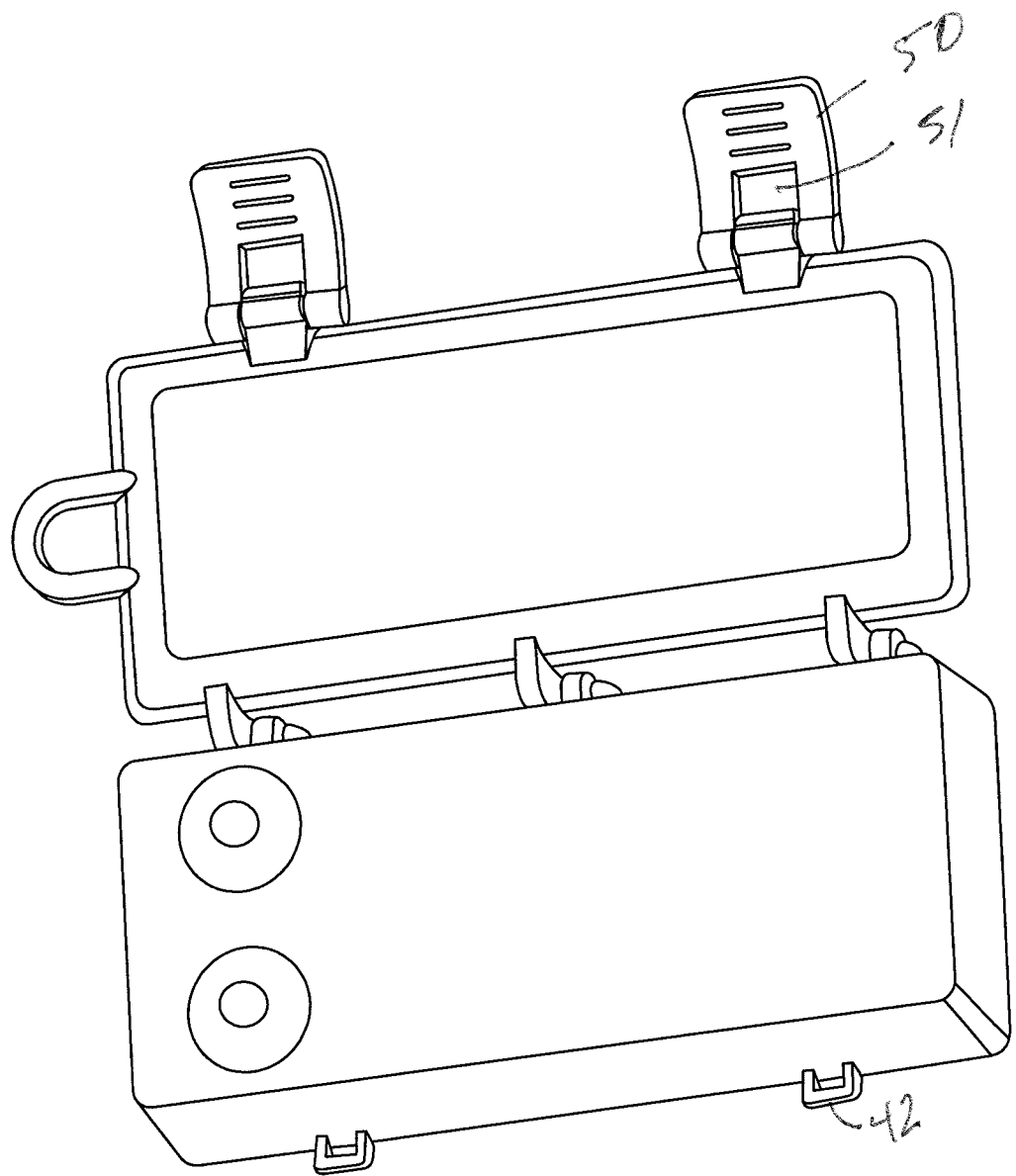
FIG. 15 is a perspective view of FIG. 12.
Figure 16:
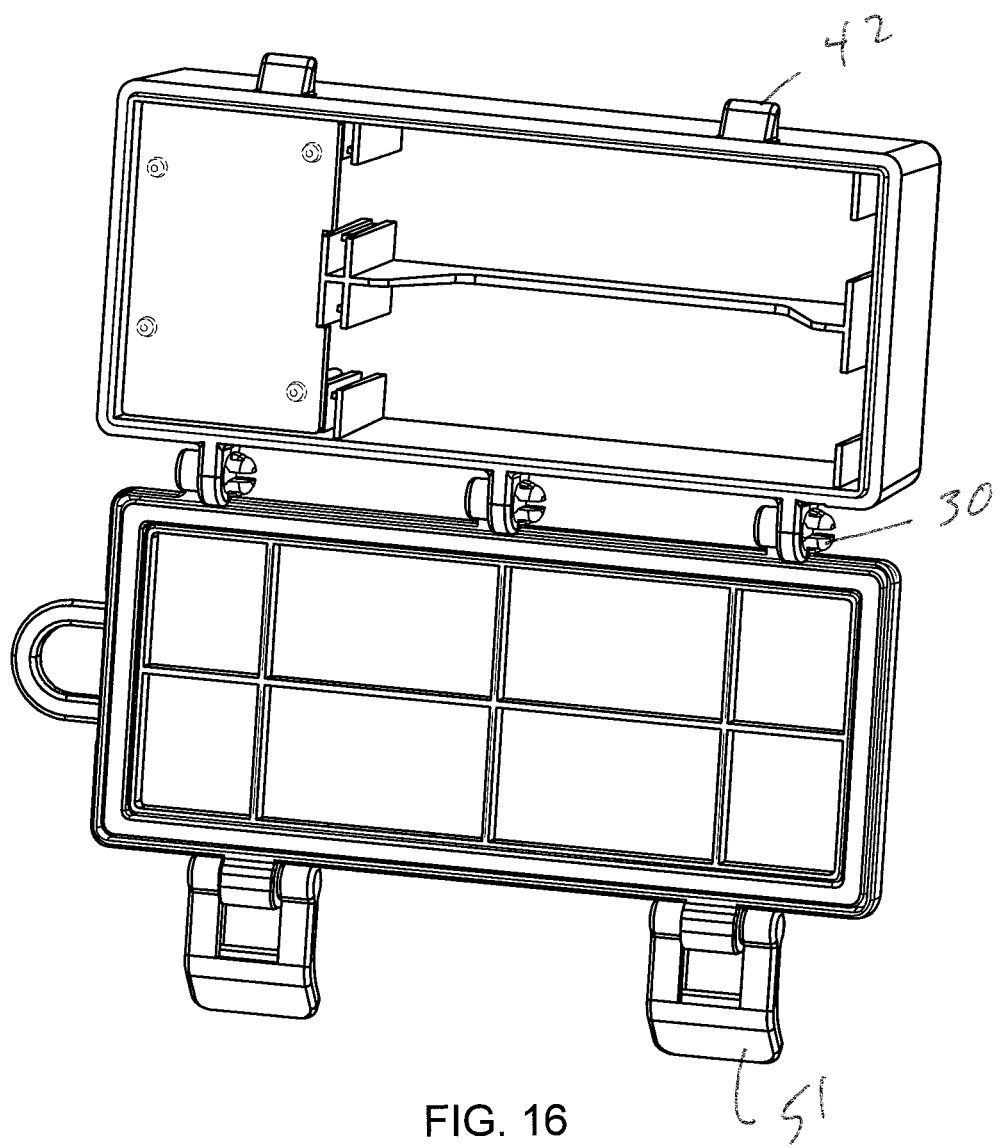
FIG. 16 is a perspective view of FIG. 14.
Figure 17:
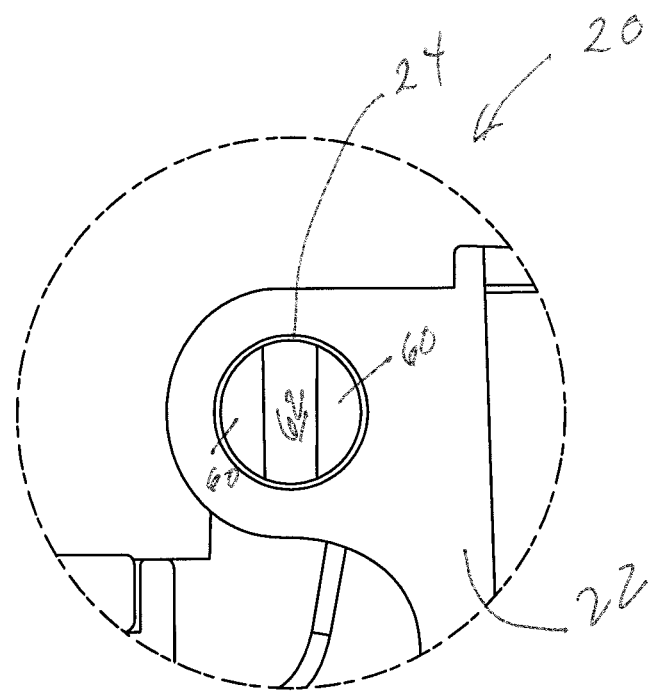
FIG. 17 is a sectional view looking into a hinge pin.
Figure 18:
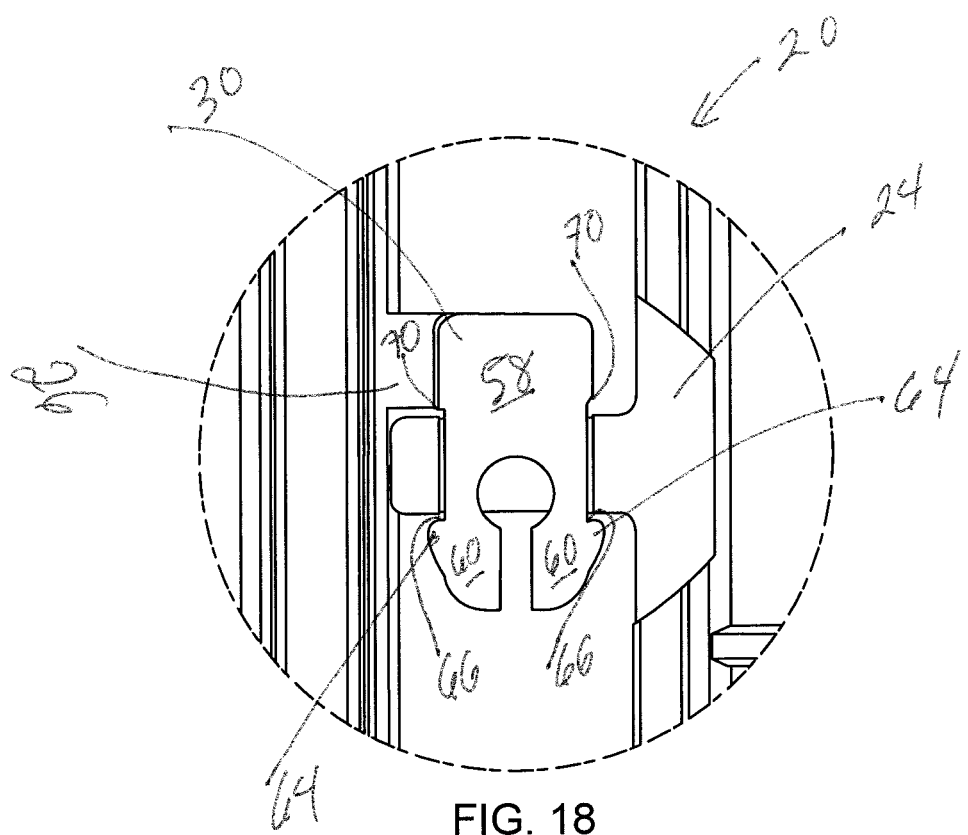
FIG. 18 is a sectional view through a hinge and hinge pin.

The hinges are most clearly shown in FIGS. 6, 17 and 18. There are two parts to the hinge, one part attached to each part 13/14 of the box. One part 22 extends orthogonally from on half of the box and has an aperture 24 hinge pin 30 is either integral to part 26 or can be inserted into a hole in part 26. Either way the hinge pin is parallel to the longitudinal dimension of the box. It includes a body 58 with a distal portion having two prongs 62 having a hook end projection/barbs 64, a shoulder portion 66 and a gap 65 therebetween. The gap allows the prongs, which are resilient, to be deflected sufficiently toward each other, that they will fit through aperture 24 and then spring a part at the shoulder 66. This prevents withdrawal of the pins. The hinge rides on a portion of the pin between shoulders 64 and 70 which define a region of diameter sized just smaller than (or, alternatively smaller than) the aperture 24, a recessed region.

The box halves can be separated by squeezing prongs 60 so that they are smaller than the aperture 24 and with drawing the pins.

The description of the invention and its applications as set forth herein is illustrative and is not intended to limit the scope of the invention. Variations and modifications of the embodiments disclosed herein are possible and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

The invention claimed is:

1. A control and battery box for a decorative lighting apparatus, the control and battery box comprising:
   a housing having a battery compartment for batteries,
   the housing having a first part and a second part of the battery compartment and a hinged cover,
   the hinged cover having an exterior face including at least one actuation switch on the exterior face thereof;
   hinges including a first part extension being an orthogonal extension extending from the first part of the battery compartment, the first part extension having an aperture and;
   a second part extension extending from the second part of the battery compartment and being an orthogonal extension with a pin extending orthogonally from the second part extension, and
   the pin including a pair of space apart prongs, said pair of space apart prongs together being sized to be received in said aperture when in a compressed state, and then which expands outside of said aperture when in an uncompressed state.

2. The control and battery box of claim 1 wherein said pair of space apart prongs are resilient and deflectable.

3. The control and battery box of claim 1 wherein said pair of space apart prongs has a distal end which includes a barb to prevent withdrawal.

4. The control and battery box of claim 1 wherein the said pair of space apart prongs include a central recess bounded by raised shoulders.

5. The control and battery box of claim 1 wherein at least one of the hinges includes an aperture and wherein said pair of space apart prongs have an outer diameter, when compressed, being less than said aperture and, when uncompressed, being larger than said aperture, so that each prong of said pair of space apart prongs is retained within said aperture when uncompressed.

6. The control and battery box of claim 1 further including a latch, said latch having a hinged flap and a lip, said hinged flap including an aperture large enough to allow the lip therethrough.

7. The control and battery box of claim 6 wherein the lip has an arcuate portion.

8. The control and battery box of claim 6 wherein the lip is deflectable when engaging said hinged flap.

9. A control box for a decorative lighting apparatus, the control box comprising:

a housing having a first part and a second parts of a compartment and a hinged cover; and hinges including a first part extension being an orthogonal extension extending from the first part of the compartment, the first part extension having an aperture and a second part extension extending from the second part of the compartment and being an orthogonal extension with a pin extending orthogonally from the second part extension, and the pin including a pair of space apart prongs, said pair of space apart prongs together being sized to be received in said aperture when in a compressed state, and then being expanded outside of said aperture when in an uncompressed state; and a pair of latches on the box for securing said first and second parts together.

10. A method of making a control box for a decorative lighting apparatus, the method comprising:

forming a housing having a first part and a second parts of a compartment and a hinged cover;

forming hinges on the compartment, including a first hinge part being an orthogonal extension extending from the first part of the compartment, the orthogonal extension having an aperture and a second hinge part extending from the second part of the compartment and being an orthogonal extension with a pin extending orthogonally from the second hinge part; and forming the extending pin including a pair of space apart prongs, said pair of space apart prongs together being sized to be received in said aperture when in a compressed state, and then being expanded outside of said aperture when in an uncompressed state.

\* \* \* \* \*